(12) United States Patent
Panides et al.

(10) Patent No.: US 6,456,309 B1
(45) Date of Patent: Sep. 24, 2002

(54) COLOR IMAGE REGISTRATION BASED UPON BELT AND RASTER OUTPUT SCANNER SYNCHRONIZATION

(75) Inventors: Elias Panides, Whitestone, NY (US); Joannes N. M. deJong, Suffern, NY (US); Lloyd A. Williams, Mahopac, NY (US); Vittorio Castelli, Yorktown Heights, NY (US); Barry M. Wolf, Yorktown Heights, NY (US)

(73) Assignee: Xerox Corporation, Stamford, CT (US)

( * ) Notice: Subject to any disclaimer, the term of this patent is extended or adjusted under 35 U.S.C. 154(b) by 48 days.

(21) Appl. No.: 09/626,465

(22) Filed: Jul. 26, 2000

(51) Int. Cl.$^7$ .................. B41J 2/385; G01D 15/06; G03G 15/01
(52) U.S. Cl. ........................ 347/116; 347/235
(58) Field of Search ................. 347/116, 129, 347/133, 154, 233, 234, 235, 248, 250; 399/162, 167, 301

(56) References Cited

U.S. PATENT DOCUMENTS

| 5,053,826 A | 10/1991 | Castelli et al. |
| 5,233,402 A | * 8/1993 | Yagi et al. ............... 347/116 X |
| 5,243,396 A | 9/1993 | Castelli et al. |
| 5,287,160 A | 2/1994 | Dastin et al. |
| 5,302,973 A | * 4/1994 | Costanza et al. ........... 347/233 |
| 6,023,286 A | 2/2000 | Nowak et al. ............... 347/256 |
| 6,055,005 A | 4/2000 | Appel et al. ................ 347/116 |
| 6,141,031 A | 10/2000 | Nowak et al. ............... 347/236 |
| 6,144,478 A | 11/2000 | Nowak et al. ............... 359/210 |
| 6,166,749 A | * 12/2000 | Lee ............................ 347/116 |

* cited by examiner

Primary Examiner—Sandra Brase
(74) Attorney, Agent, or Firm—John M. Kelly; David E. Henn (57) ABSTRACT

Color electrophotographic printers having latent image positions synchronized with start-of-scan signals. A laser source projects a laser beam onto a multifaceted rotating polygon that sweeps that beam in a scan line across a moving photoreceptor. A start-of-scan detector produces start-of-scan signals when the laser beam is in position to write a scan line. A belt sensor produces belt signals when indicia on the photoreceptor passes a reference position. A controller receives the belt signals and the start-of-scan and then adjusts the photoreceptors rotational velocity such that the belt signals are an integral multiple of the start-of-scan signals. To reduce the impact of drive roller eccentricities on belt signal to start-of-scan signal timing, the perimeters of photoreceptor roller elements are sub-multiples of the photoreceptor length.

17 Claims, 5 Drawing Sheets

COLOR IMAGE REGISTRATION BASED UPON BELT AND RASTER OUTPUT SCANNER SYNCHRONIZATION

FIELD OF THE INVENTION

This invention relates to synchronizing images in color electrophotographic printing machines.

BACKGROUND OF THE PRESENT INVENTION

Electrophotographic marking is a well-known, commonly used method of copying or printing documents. Electrophotographic marking is performed by exposing a charged photoreceptor with a light image representation of a desired document. The photoreceptor is discharged in response to that light image, creating an electrostatic latent image of the desired document on the photoreceptor's surface. Toner particles are then deposited onto that latent image, forming a toner image, which is then transferred onto a substrate, such as a sheet of paper. The transferred toner image is then fused to the substrate, usually using heat and/or pressure, thereby creating a permanent record of the original representation. The surface of the photoreceptor is then cleaned of residual developing material and recharged in preparation for the production of other images.

The foregoing broadly describes a black and white electrophotographic printing machine. Electrophotographic marking can also produce color images by repeating the above process once for each color of toner that is used to make the composite color image. For example, in one color process, referred to herein as the REaD IOI process (Recharge, Expose, and Develop, Image On Image), a charged photoreceptive surface is exposed to a light image which represents a first color, say black. The resulting electrostatic latent image is then developed with black toner particles to produce a black toner image. The charge, expose, and develop process is repeated for a second color, say yellow, then for a third color, say magenta, and finally for a fourth color, say cyan. The various color toner particles are placed in superimposed registration such that a desired composite color image results. That composite color image is then transferred and fused onto a substrate.

The REaD IOI process can be performed in various ways. For example, in a single-pass printer wherein the composite image is produced in a single pass of the photoreceptor. This requires a charging, an exposing, and a developing station for each color of toner. Single-pass printers are advantageous in that they are relatively fast. However, they are also relatively expensive since multiple charging, exposing, and developing stations are required. An alternative to single-pass color printing is multiple-pass color printing. In a multipass color printer an image for one color component is produced in one pass, another color component is produced in the next pass, and so on. However, in both types of printing engine mentioned above, it is very important that the color components are properly registered. Registration defects produce final images which are distorted and, more importantly, incorporate serious quality defects.

One way of exposing the photoreceptor is to use a Raster Output Scanner (ROS). A ROS is typically comprised of a laser light source (or sources), a pre-polygon optical system, a rotating polygon having a plurality of mirrored facets, and a post-polygon optical system. In a simplified description of the ROS operation, a collimated light beam is reflected from facets of an optical polygon and passes through imaging elements that project it into a finely focused spot of light on the photoreceptor surface. As the polygon rotates, the focused spot traces a path on the photoreceptor surface referred to as a scan line. By moving the photoreceptor as the polygon rotates, the spot scans a raster of lines on the surface of the photoreceptor. By modulating the laser beam with image information a predetermined latent image is produced on the photoreceptor.

Figure 1:
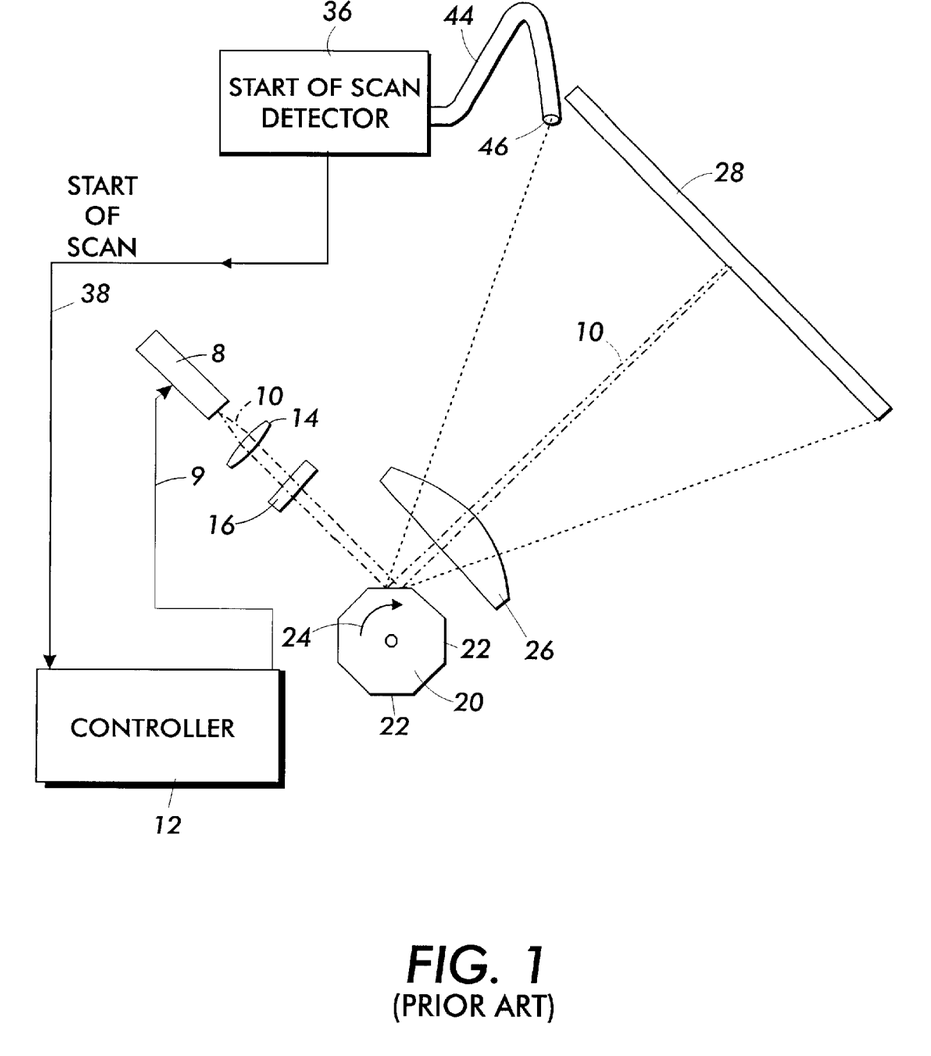
FIG. 1 schematically illustrates a prior art exposure station, including a start-of-scan sensor.

Referring now to FIG. 1, a typical prior art exposure station includes a laser diode 8 that emits a laser beam 10 that is modulated in response to drive signals from a controller 12 applied on a line 9. As emitted from the laser diode, the laser beam 10 is divergent. A lens 14 collimates that diverging beam and directs the collimated beam through a cylindrical lens 16 that has focusing power only in the sagittal direction. After passing through the cylindrical lens 16 the laser beam is incident on a polygon 20 that includes a plurality of mirrored facets 22. The polygon is rotated at a constant rotational velocity by a motor (not shown) in a direction 24. The mirrored facets deflect the laser beam as the polygon rotates, resulting in a sweeping laser beam. A post-scan optical system 26 focuses the laser beam 10 to form a spot of circular or elliptic cross sectional shape on a moving photoreceptor 28. The post-scan optical system 26 is typically an F-theta lens design intended to correct for scan line nonlinearity (see below). In FIG. 1, the direction of photoreceptor motion would be into (or out of) the view plane. By properly modulating the laser beam 10 as the focused spot sweeps across the photoreceptor, a desired latent image is produced. That latent image is comprised of multiple scan lines, each of which is comprised of a plurality of image elements referred to as pixels.

In a color printer all scan lines are ideally geometrically straight lines that start at the same relative position on the photoreceptor and that have evenly spaced, identically sized pixels. Furthermore, each color component of the composite color image is perfectly registered with all of the other color components. Unfortunately, obtaining such ideal scan lines is very difficult. One particular problem is having each of the color components start at the proper place. Consider a yellow color component on a photoreceptor. This color component is comprised of a large number of scan lines, say 600 scan lines per inch. When the next color component (say magenta) is to be exposed the polygon facet that writes the first scan line of the magenta color component might not be in position to start a scan line. A delay of up to 1 scan lines might be required simply to bring the polygon facet into position to start a scan line.

Determining when a facet is in position to start a scan line is the job of a start-of-scan (SOS) detector. FIG. 1 shows a simple start-of-scan detector 36 that produces start-of scan signals when a facet is properly located. The start-of-scan detector 36 incorporates a fiber-optic element 44 that guides light received at its input end 46, which is in the scanning plane of the raster output scanner, to a photosensitive element (not shown). In response to a received light pulse produced by the sweeping scan line, the start-of-scan detector produces the start-of-scan signal on a line 38. That signal enables the controller 12 to begin producing a scan line at the correct relative location across the photoreceptor.

Figure 2:
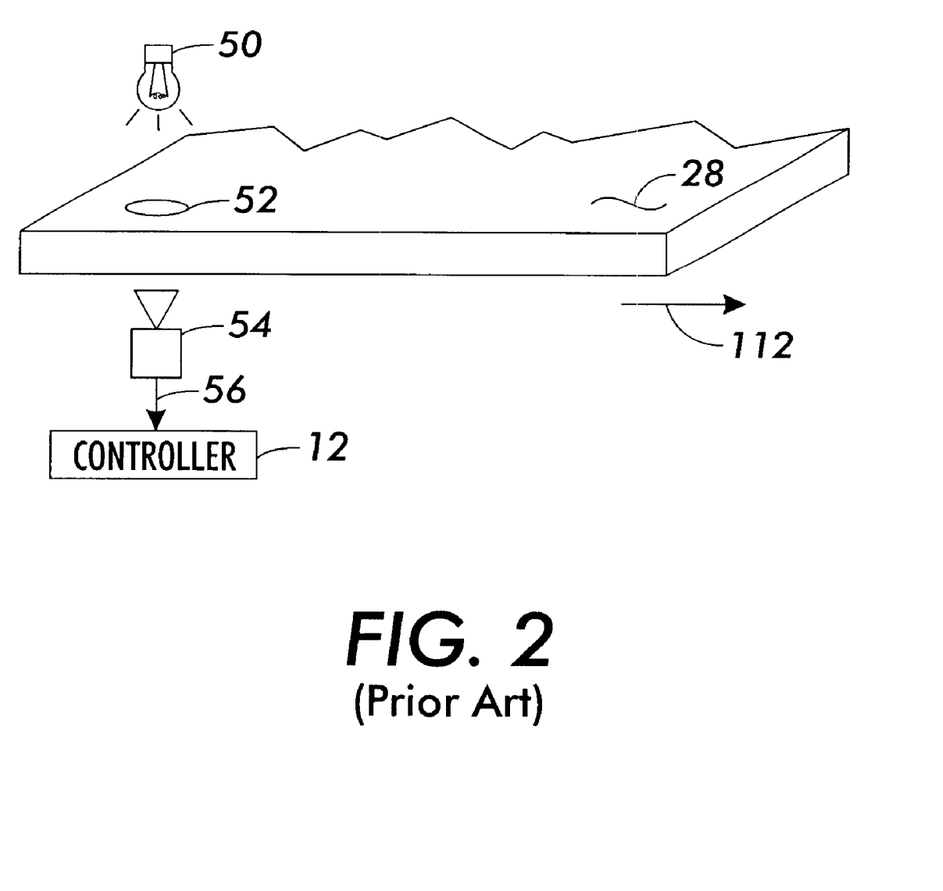
FIG. 2 schematically illustrates a prior art belt-hole sensor.

Determining where on the photoreceptor a color component is to be imaged is the job of a page detector. While many types of page detectors exist, probably the most common is the belt hole sensor. FIG. 2 illustrates one type of belt hole sensor. As shown, a light source 50 illuminates a belt hole 52 that passes through a photoreceptor 28 that moves in a direction 112. Opposite the light source is a light sensor 54. When the belt hole 52 is located between the light source and the light sensor, the illuminating light is detected. The light sensor 54 then signals the controller 12 via a line 56 that the belt hole is at a known location. The controller then controls the modulation applied to the laser diode 8 such that a latent image is produced at a desired location on the photoreceptor 28.

In view of the above, a technique of avoiding the delays required to bring the polygon facet into position to write the first scan line of a color image component would be beneficial.

SUMMARY OF THE PRESENT INVENTION

The principles of the present invention provide for color electrophotographic printers having latent image positions synchronized with start-of-scan signals. A printer according to the present invention includes a laser source that projects a laser beam onto a multifaceted rotating polygon that sweeps that beam in a scan line across a moving photoreceptor. A start-of-scan detector produces start-of-scan signals when the laser beam is in position to write a scan line. A belt sensor produces belt signals when indicia on the photoreceptor pass a reference position. A controller receives the belt signals and the start-of-scan and then adjusts the photoreceptor velocity such that the belt signals are an integral multiple of the start-of-scan signals. On printers with more than one imaging station, the rotational velocities of each ROS producing the scan lines on the photoreceptor are appropriately varied so that all color image components start on coincident scan line positions. To reduce the impact of drive roller eccentricities on belt signal to start-of-scan signal timing, the perimeters of photoreceptor roller elements are sub-multiples of the photoreceptor length.

BRIEF DESCRIPTION OF THE DRAWINGS

For a general understanding of the features of the present invention, reference is made to the drawings, wherein like reference numerals have been used throughout to designate identical elements, and in which.

DETAILED DESCRIPTION OF THE PRESENT INVENTION

Figure 3:
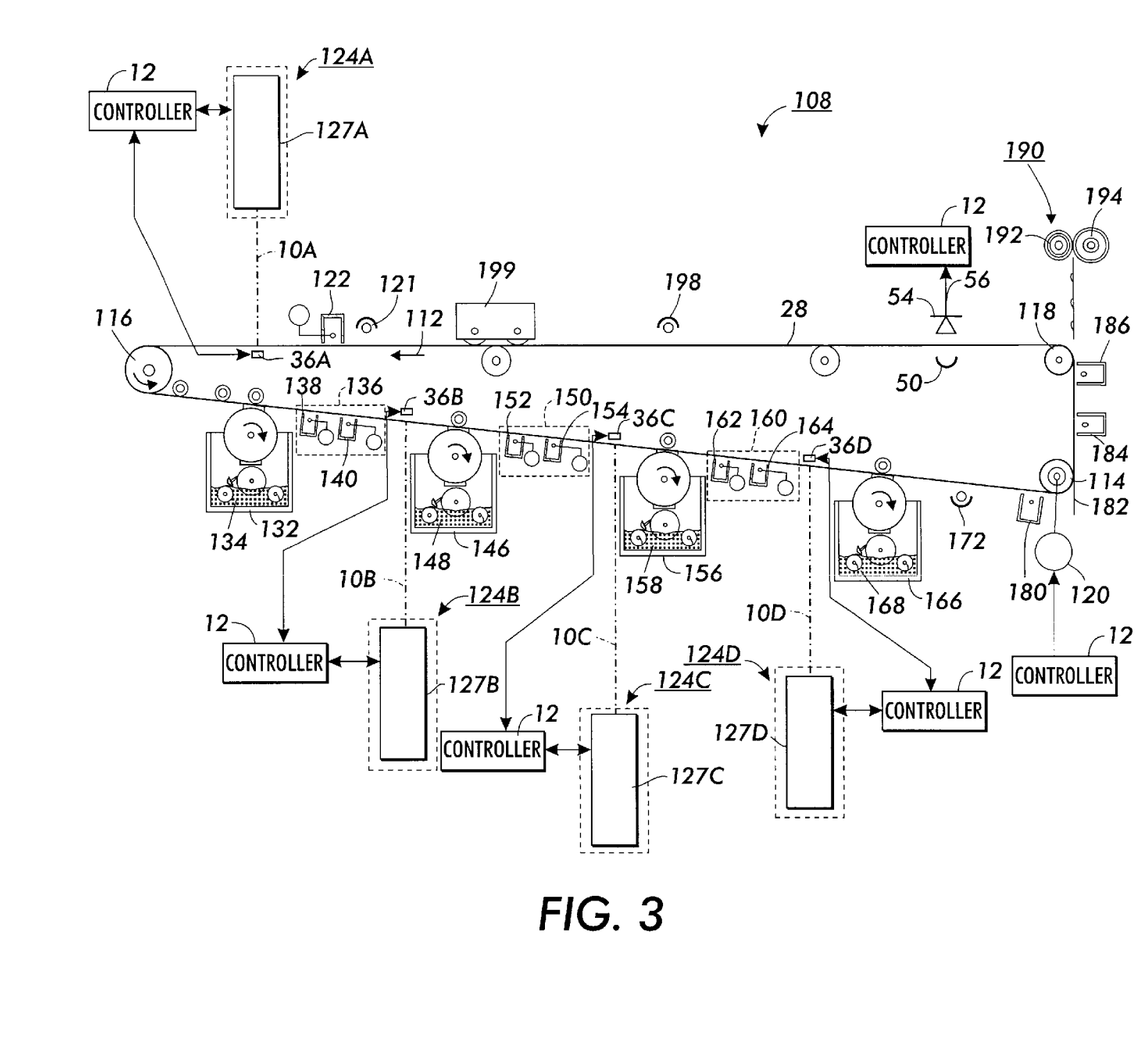
FIG. 3 schematically illustrates a single-pass color electrophotographic printer that incorporates the principles of the present invention.

FIG. 3 illustrates a single-pass, Recharge-Expose-and-Develop, Image-on-Image (Read IOI) color printer 108 that is in accord with the principles of the present invention. However, it is to be understood that the following description of the color printer 108 is only to assist the understanding of the principles of the present invention.

The color printer 108 includes a photoreceptor belt 28 which travels in the direction indicated by the arrow 112. Belt travel is brought about by mounting the photoreceptor belt about a driven roller 114 and about tension rollers 116 and 118, and then driving the driven roller 114 with a motor 120.

As the photoreceptor belt travels each part of it passes through each of the subsequently described process stations. For convenience, a single section of the photoreceptor belt, referred to as the image area, is identified. The image area is that part of the photoreceptor belt which is to receive the various actions and toner layers that produce the final composite color image. While the photoreceptor belt may have numerous image areas, since each image area is processed in the same way a description of the processing of one image area suffices to explain the operation of the color printer 108.

The imaging process begins with the image area passing a "precharge" erase lamp 121 that illuminates the image area so as to cause any residual charge which might exist on the image area to be discharged. Such erase lamps are common in high quality systems and their use for initial erasure is well known. As the photoreceptor belt continues its travel, the image area passes a charging station comprised of a corotron 122. The corotron charges the image area in preparation for exposure to create a latent image for black toner. For example, the corotron might charge the image area to a substantially uniform potential of about −500 volts. It should be understood that the actual charge placed on the photoreceptor will depend upon many variables, such as the black toner mass that is to be developed and the settings of the black development station (see below).

After passing the charging station the image area advances to an exposure station 124A. At the exposure station the charged image area is exposed to a modulated laser beam 10A from a raster output scanner 127A that raster scans the image area such that an electrostatic latent representation of a black image is produced. The exposure station 124A produces a linear scan line that begins at a predetermined position on the photoreceptor and that has a predetermined scan line length. A more detailed description of the exposure station is given subsequently.

Still referring to FIG. 3, after passing the exposure station 124A the exposed image area with the black latent image passes a black development station 132 that advances black toner 134 onto the image area so as to develop a black toner image. Biasing is such as to effect discharged area development (DAD) of the lower (less negative) of the two voltage levels on the image area. The charged black toner 134 adheres to the illuminated parts of the image area. The voltage of the illuminated parts of the image area is about −200 volts. The non-illuminated parts of the image area remain at about −500 volts.

After passing the black development station 132 the image area advances to a recharging station 136 comprised of a DC corotron 138 and an AC scorotron 140. The recharging station 136 recharges the image area and its black toner layer using a technique known as split recharging. Briefly, the DC corotron 138 overcharges the image area to a voltage level greater than that desired when the image area is recharged, while the AC scorotron 140 reduces that voltage level to that which is desired. Split recharging serves to substantially eliminate voltage differences between toned areas and untoned areas and to reduce the level of residual charge remaining on the previously toned areas.

The recharged image area with its black toner layer then advances to an exposure station 124B. There, a laser beam 10B from a raster output scanner 127B exposes the image area to produce an electrostatic latent representation of a yellow image. In the same manner (described subsequently) as the exposure station 124A, the location, length, and linearity of the scan line on the photoreceptor is determined and controlled. Furthermore, laser beam 10B is modulated such that the yellow latent image is in superimposed registration with the black latent image.

The now re-exposed image area then advances to a yellow development station 146 that deposits yellow toner 148 onto the image area. After passing the yellow development station the image area advances to a recharging station 150 where a DC scorotron 152 and an AC scorotron 154 split recharge the image area.

An exposure station 124C then exposes the recharged image area. A modulated laser beam 10C from a raster output scanner 127C exposes the image area to produce an electrostatic latent representation of a magenta image. In the same manner (described subsequently) as the exposure stations 124A and 124B, the location and the length of the scan line on the photoreceptor is determined and controlled. Furthermore, the laser beam 10C is modulated such that the magenta latent image is in superimposed registration with the black and yellow latent images.

After passing the magenta exposure station the now re-exposed image area advances to a magenta development station 156 that deposits magenta toner 158 onto the image area. After passing the magenta development station the image area advances another recharging station 160 where a DC corotron 162 and an AC scorotron 164 split recharge the image area.

The recharged image area with its toner layers then advances to an exposure station 124D. There, a laser beam 10D from a raster output scanner 127D exposes the image area to produce an electrostatic latent representation of a cyan image. In the same manner (described subsequently) as the exposure stations 124A, 124B, and 124C, the location and the length of the scan line on the photoreceptor is determined and controlled. Furthermore, the laser beam 10D is modulated such that the cyan latent image is in superimposed registration with the black, yellow, and magenta latent images.

After passing the exposure station 124D the re-exposed image area advances past a cyan development station 166 that deposits cyan toner 168 onto the image area. At this time four colors of toner are on the image area, resulting in a composite color image. However, the composite color toner image is comprised of individual toner particles that have charge potentials that vary widely. Directly transferring such a composite toner image onto a substrate would result in a degraded final image. Therefore it is beneficial to prepare the composite color toner image for transfer.

To prepare for transfer a pretransfer erase lamp 172 discharges the image area to produce a relatively low charge level on the image area. The image area then passes a pretransfer DC scorotron 180 that performs a pre-transfer charging function. The image area continues to advance in the direction 112 past the driven roller 114. A substrate 182 is then placed over the image area using a sheet feeder (which is not shown). As the image area and substrate continue their travel they pass a transfer corotron 184 that applies positive ions onto the back of the substrate 182. Those ions attract the negatively charged toner particles onto the substrate.

As the substrate continues its travel it passes a detack corotron 186. That corotron neutralizes some of the charge on the substrate to assist separation of the substrate from the photoreceptor 28. As the leading edge of the substrate 182 moves around the tension roller 118 the substrate lip separates from the photoreceptor. The substrate is then directed into a fuser 190 where a heated fuser roller 192 and a pressure roller 194 create a nip through which the substrate 182 passes. The combination of pressure and heat at the nip causes the composite color toner image to fuse into the substrate. After fusing, a chute, not shown, guides the substrate to a catch tray, also not shown, for removal by an operator.

After the substrate 182 is separated from the photoreceptor belt 28 the image area continues its travel and passes a preclean erase lamp 198. That lamp neutralizes most of the charge remaining on the photoreceptor belt. After passing the preclean erase lamp the residual toner and/or debris on the photoreceptor is removed at a cleaning station 199. The image area then passes once again to the precharge erase lamp 121 and the start of another printing cycle.

In addition to the elements described above, the printer 108 also includes a system controller 12 (shown in six places in FIG. 3) that controls the overall operation of the printer. The system controller preferably comprises one or more programmable microprocessors that operate in accordance with a software program stored in a suitable memory. Of particular importance to understanding the present invention is that the system controller synchronizes the overall operation the printer 108 and provides video information that modulates the laser beams 10A–10D.

Figure 4:
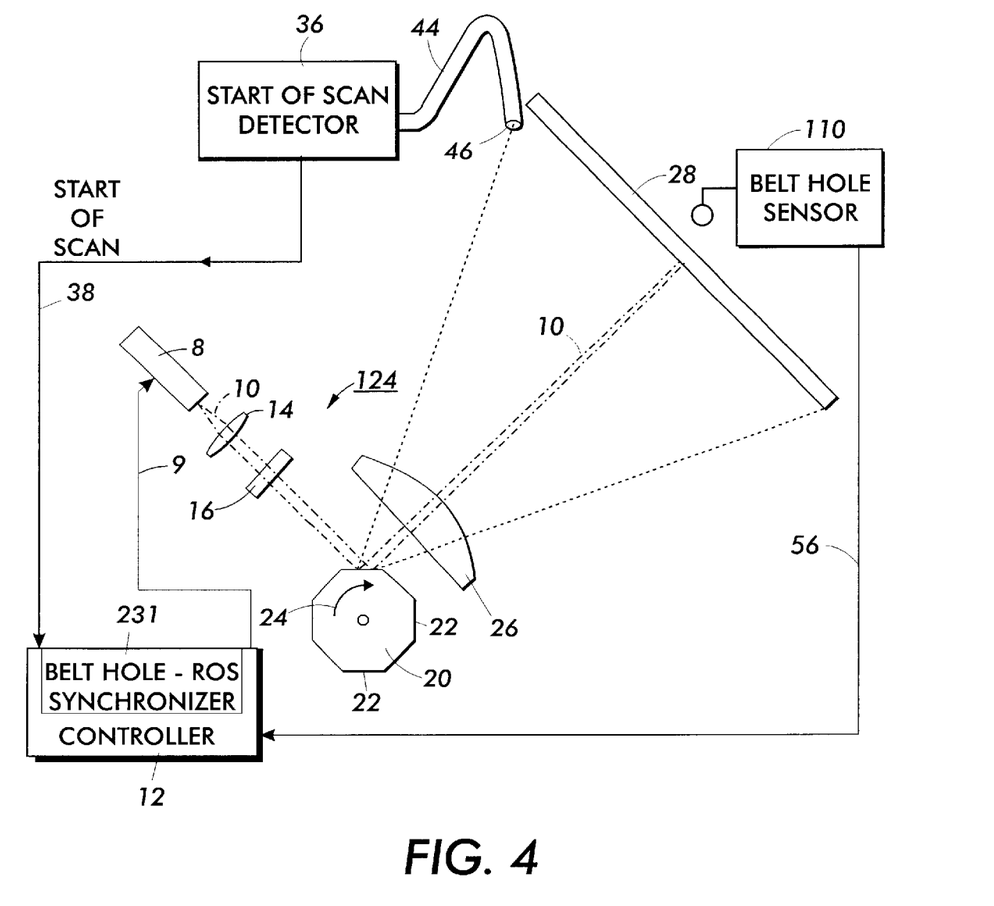
FIG. 4 schematically illustrates an exposure station in which the controller synchronizes the photoreceptor velocity such that the belt holes are synchronized with the operation of the raster output scanner.

FIG. 4 schematically illustrates an exposure station that is in accord with the principles of the present invention. That exposure station is similar to the exposure station of FIG. 1 in that a laser beam 10 is produced by a laser diode 8. Furthermore, the operation of the lenses 14, 16, and 26, as well as the polygon 20 are the same. In addition to the exposure station, FIG. 4 shows a start-of-scan detector 36, a belt hole sensor 110, and a controller 12. The start-of-scan detector 36 still sends a start-of-scan signal via a line 38 to the controller 12. Furthermore, the belt hole sensor 110 sends a belt hole signal to the controller 12 as shown in FIG. 2. However, the controller 12 includes a belt-hole to ROS synchronizer 231.

Figure 5:
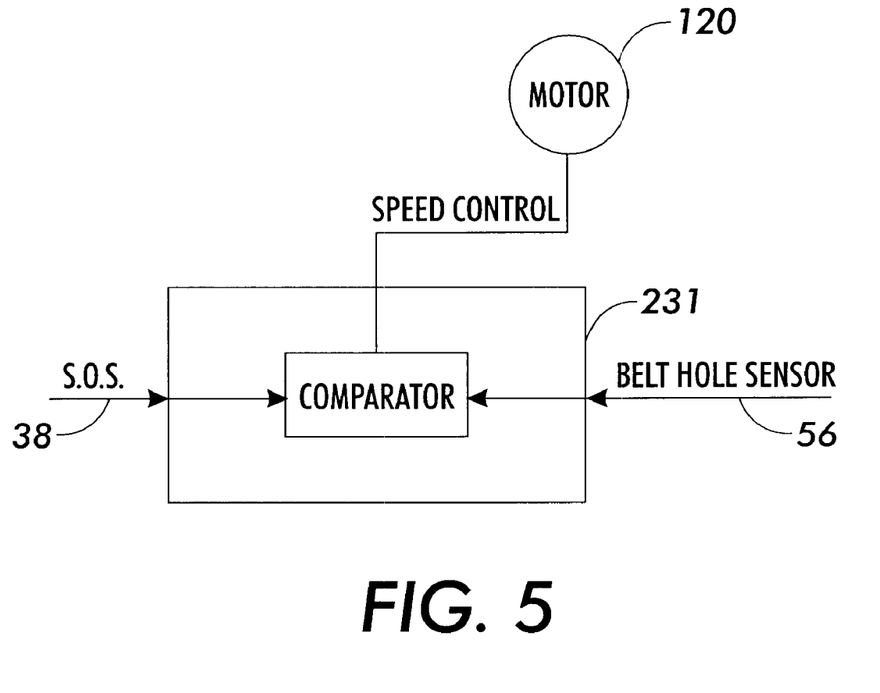
FIG. 5 schematically illustrates the belt hole to ROS synchronizer shown in FIG. 4.

The operation of the belt-hole to ROS synchronizer 231 is best understood with reference to FIG. 5. As shown, the belt-hole to ROS synchronizer 231 receives both the start-of-scan signal on line 38 and the belt hole signal on line 56. The belt-hole to ROS synchronizer then compares the timing between the start-of-scan signal and the belt hole signal. The speed control for the motor 120 is then adjusted such that the start-of-scan signals occurs an integer number N times between each belt hole signals. This synchronizes the start-of-scan signals with the belt hole signals. Therefore, when the belt hole signal signals that a new page is to be written a polygon facet 22 is in position to write the first scan line of that image.

While belt-hole to ROS synchronization is generally beneficial, in practice certain mechanical inaccuracies, specifically eccentricity of the rolls 114, 116, and 118, can cause significant, but undetectable, belt velocity variations. However, the impact of such belt velocity variations can be reduced by having the perimeter of each roll be an integer sub-multiple of the distance between any two imagers. The terminology "distance between any two imagers" includes entire revolutions of the photoreceptor. Therefore, the perimeters of the above-mentioned rolls must also be integer submultiples of the length of the photoreceptor 28.

While the principles of the present invention have been described in conjunction with a single pass, color electrophotographic printer, those principles are not limited to such printers. For example, multiple pass color printers and hybrid printers can also benefit from those principles.

Indeed, the principles of the present invention may be more important in multiple pass and hybrid printers than with single pass, color printers.

Multiple pass color printers usually use a single imaging station. In such printers an implementation of the present invention adjusts the speed of either the photoreceptor or of the ROS such that one revolution of the photoreceptor occurs in an exact integer number of ROS scan lines. In single-pass color printers (such as the one shown in FIG. 3) the rotational velocity of all of the ROS imaging stations are the same and their relative phases are adjusted such that all components of the final color image are made up of coincident scan lines of each color on the photoreceptor. Multipass color printers that use more than one imaging station are called hybrid printer. Such printers require that both of the rules expressed in this paragraph be satisfied.

Furthermore, many alternatives, modifications and variations will be apparent to those skilled in the art. Accordingly, the present invention is intended to embrace all alternatives, modifications, and variations that fall within the spirit and scope of the claims.

What is claimed is:

1. An imaging station, comprising:
   a moving photoreceptor belt having sensing indicia,
   a belt sensor for detecting said sensing indicia and for producing a belt signal from that detection;
   a laser source for emitting a laser beam;
   a multifaceted rotating polygon for sweeping said laser beam across said moving photoreceptor so as to form a scan line in a scan line plane;
   a start-of-scan detector for sensing said sweeping laser beam and for producing start-of-scan signals when the laser beam is in position to begin writing a scan line;
   a motor for moving said photoreceptor belt at a speed that depends upon motor input power;
   a controller for receiving said belt signals and said start-of-scan signals, said controller for controlling said motor input power such that said belt signals are an integral multiple of said start-of-scan signals; and
   a roller over which said photoreceptor belt travels, wherein said roller has a perimeter that is a submultiple of a perimeter of said photoreceptor belt.

2. An imaging station according to claim 1, wherein said motor drives said roller.

3. A marking machine, comprising:
   a moving photoreceptor belt having a sensing indicia, said photoreceptor belt traveling over a drive roller;
   a charging station for charging said photoreceptor belt;
   an imaging station for exposing said charged photoreceptor belt so as to produce a latent image;
   a developer for depositing toner on said latent image;
   a transfer station for transferring said deposited toner onto a substrate;
   a fuser for fusing said transferred toner to said substrate; and
   a cleaning station for cleaning said photoreceptor;
   wherein said imaging station includes:
      a belt sensor for detecting said sensing indicia and for producing a belt signal from that detection;
      a laser source for emitting a laser beam;
      a multifaceted rotating polygon for sweeping said laser beam across said moving photoreceptor so as to form a scan line in a scan line plane;
      a start-of-scan detector for sensing said sweeping laser beam and for producing start-of-scan signals when said laser beam is in position to begin writing a scan line;
      a motor for moving said drive roller such that said photoreceptor belt moves at a speed that depends upon a motor input power;
      a controller for receiving said belt signals and said start-of-scan signals, said controller for controlling said motor input power such that said belt signals are an integral multiple of said start-of-scan signals; and
      a roller over which said photoreceptor belt travels, wherein said drive roller has a perimeter that is a submultiple of the perimeter of said photoreceptor belt.

4. A color printer, comprising:
   a moving photoreceptor belt having a sensing indicia, said photoreceptor belt traveling over a drive roller;
   a charging station for charging said photoreceptor belt;
   a first imaging station for exposing said charged photoreceptor belt so as to produce a first latent image;
   a first developer for depositing toner of a first color on said first latent image;
   a second imaging station for exposing said charged photoreceptor belt so as to produce a second latent image;
   a second developer for depositing toner of a second color on said second latent image;
   a transfer station for transferring said deposited first color of toner and said deposited second color of toner onto a substrate;
   a fuser for fusing said transferred toner to said substrate; and
   a cleaning station for cleaning said photoreceptor;
   wherein said first imaging station includes:
      a belt sensor for detecting said sensing indicia and for producing a belt signal from that detection;
      a laser source for emitting a laser beam;
      a multifaceted rotating polygon for sweeping said laser beam across said moving photoreceptor so as to form a scan line in a scan line plane;
      a start-of-scan detector for sensing said sweeping laser beam and for producing start-of-scan signals when said laser beam is in position to begin writing a scan line;
      a motor for moving said drive roller such that said photoreceptor belt moves at a speed that depends upon a motor input power;
      a controller for receiving said belt signals and said start-of-scan signals, said controller for controlling said motor input power such that said belt signals are an integral multiple of said start-of-scan signals; and
      a roller over which said photoreceptor belt travels, wherein said drive roller has a perimeter that is a submultiple of a perimeter of said photoreceptor belt.

5. A marking machine according to claim 4, wherein said drive roller has a perimeter that is an integer sub-multiple of the distance between said first imaging station and said second imaging station.

6. An imaging station comprising:
   a roller and a photoreceptor belt each having a perimeter, the photoreceptor belt travelling over the roller, and the roller perimeter being an integer sub-multiple of the photoreceptor belt perimeter;
   a belt sensor arranged to detect sensing indicia on the photoreceptor belt when the photoreceptor belt is driven via the roller by a motor whose speed depends upon motor input power, the belt sensor generating and sending belt signals;
   a start-of-scan detector sensing a laser beam generated by a laser source and sweeping across the photoreceptor via a multifaceted rotating polygon so as to form a scan line in a scan line plane, the start-of-scan detector producing start-of-scan signals when the laser beam is in position to begin writing a scan line; and a controller receiving the belt signals and the start-of-scan signals and controlling a motor input power such that the belt signals are an integral multiple of the start-of-scan signals.

7. An imaging station according to claim 6, wherein said sensing indicia comprises a hole through said photoreceptor belt.

8. An imaging station according to claim 7, wherein said belt sensor includes a light source for illuminating said photoreceptor belt and a photosensor for sensing illuminating light that passes through said hole.

9. An imaging station according to claim 6 wherein the motor drives the roller.

10. A marking machine comprising:

a moving photoreceptor belt and a charging station, an imaging station, a developer, a fuser, and a cleaning station, the photoreceptor belt having sensing indicia and traveling over a drive roller having a perimeter that is an integer sub-multiple of a perimeter of the photoreceptor belt, the charging station charging the photoreceptor belt, the imaging station exposing the charged photoreceptor belt to produce a latent image, the developer depositing toner on the latent image, the transfer station transferring the deposited toner onto a substrate, the fuser for fusing the transferred toner to the substrate, and the cleaning station cleaning the photoreceptor, the imaging station including:
a belt sensor that detects the sensing indicia and produces a belt signal from that detection;
a start-of-scan detector sensing a laser beam generated by a laser source and sweeping across the photoreceptor via a multifaceted rotating polygon so as to form a scan line in a scan line plane, the stan-of-scan detector producing start-of-scan signals when the laser beam is in position to begin writing a scan line;
a motor that drives the drive roller such that the photoreceptor belt moves at a speed that depends upon a motor input power; and
a controller receiving the belt signals and the start-of-scan signals and controlling the motor input power input such that the belt signals are an integral multiple of the start-of-scan signals.

11. A marking machine according to claim 10, wherein said sensing indicia includes a hole through said photoreceptor belt.

12. A marking machine according to claim 11, wherein said belt sensor includes a light source for illuminating said photoreceptor belt and a photosensor for sensing illuminating light that passes through said hole.

13. A marking machine according to claim 10, wherein said motor drives said drive roller.

14. A color printer comprising:

a moving photoreceptor belt having a sensing indicia and a photoreceptor belt perimeter, the photoreceptor belt traveling over a drive roller driven by a motor and having a roller perimeter that is at least one of an integer sub-multiple of the photoreceptor belt perimeter and an integer sub-multiple of a distance between first and second imaging stations;

a charging station that charges the photoreceptor belt, first and second imaging stations that expose the charged photoreceptor belt so as to produce respective first and second latent images, a first developer that deposits toner of a first color on the first latent image prior to formation of the second latent image, a second developer that deposits toner of a second color on the second latent image, a transfer station that transfers the deposited first and second colors of toner onto a substrate, a fuser that fuses the transferred toner to the substrate, and a cleaning station that cleans the photoreceptor;

wherein at least the first imaging station includes:
a belt sensor that detects the sensing indicia and produces a belt signal from that detection;
a start-of-scan detector sensing a laser beam generated by a laser source and sweeping across the photoreceptor via a multifaceted rotating polygon so as to form a scan line in a scan line plane, the start-of-scan detector producing start-of-scan signals when the laser beam is in position to begin writing a scan line;
a motor that drives the drive roller such that the photoreceptor belt moves at a speed that depends upon a motor input power; and
a controller receiving the belt signals and the start-of-scan signals and controlling the motor input power input such that the belt signals are an integral multiple of the start-of-scan signals.

15. A marking machine according to claim 14, wherein said sensing indicia is a hole through said photoreceptor belt.

16. A marking machine according to claim 15, wherein said belt sensor includes a light source for illuminating said photoreceptor belt and a photosensor for sensing illuminating light that passes through said hole.

17. A marking machine according to claim 14, wherein said motor drives said drive roller.

\* \* \* \* \*